Feb. 13, 1951 T. J. MORGAN 2,541,883
LAMP SUPPORT CAPABLE OF VERTICAL
AND HORIZONTAL ADJUSTMENT
Filed Oct. 16, 1946 2 Sheets-Sheet 1

INVENTOR.
Thomas J. Morgan,
BY
Soans, Pond, & Anderson,
ATTYS.

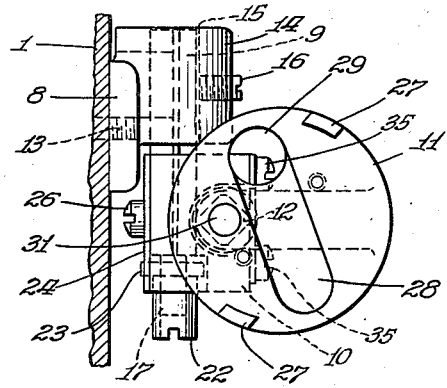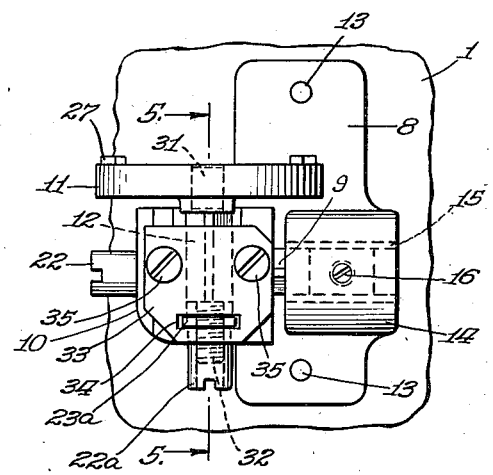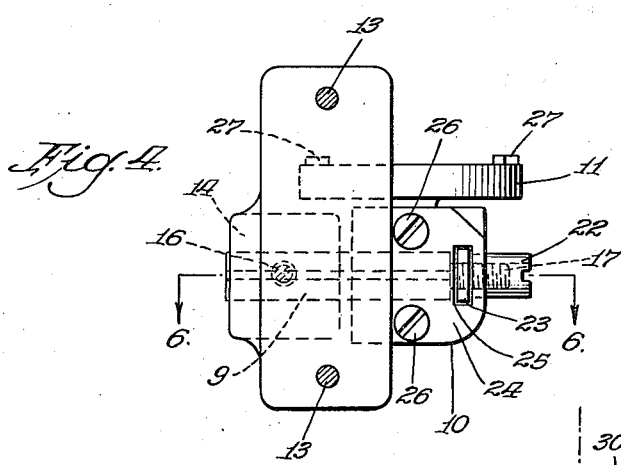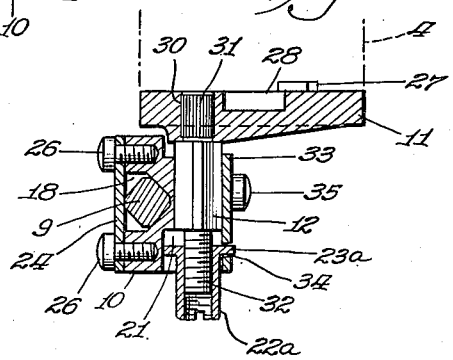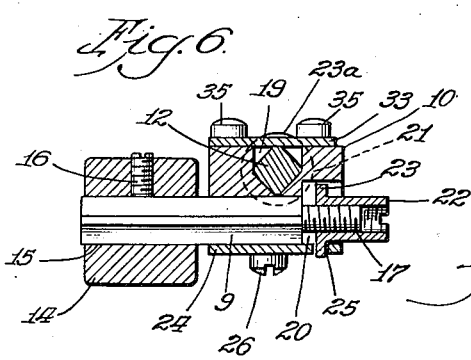

Patented Feb. 13, 1951

2,541,883

UNITED STATES PATENT OFFICE 2,541,883

LAMP SUPPORT CAPABLE OF VERTICAL AND HORIZONTAL ADJUSTMENT

Thomas J. Morgan, Chicago, Ill., assignor to Ampro Corporation, Chicago, Ill., a corporation of Illinois Application October 16, 1946, Serial No. 703,582

6 Claims. (Cl. 240—44)

The present invention relates to adjustable lamp mountings and, in particular, to adjustable lamp mountings adapted for use in motion picture projectors.

One of the most important requirements for high quality reproduction of images in motion picture projection, is the proper alignment of the bright portion of the projector lamp filament with the optical system. Since there are dimensional differences in all known projection lamps, this requirement makes it necessary to utilize an adjustable lamp support, whereby each new lamp replacement may be brought into proper alignment with the other elements of the optical system. Various adjustable supports have been devised. Most of these are either complicated, cumbersome, or unstable and few if any provide simple externally accessible means for both horizontal and vertical micrometric adjustment. On occasion the effectiveness of some of these devices has been influenced by high temperatures developed within the lamp housing.

The principal object of the present invention is to provide an improved adjustable lamp support for use in motion picture projectors, as will hereinafter appear the support of the present invention is simple and compact thereby adapting it for use in the limited available space in small-sized projectors; offering minimum impediment to ventilating air stream; it is dimensionally stable under temperature changes; and it is easily adjustable externally of lamp house. Furthermore it will not stick and become inoperable or become difficult to adjust after extended use. Other objects and advantages of the invention will be apparent by reference to the following description.

An illustrative embodiment of the invention is shown in the accompanying drawings, wherein:

Fig. 2 is a horizontal section taken on the line 2—2 of Fig. 1;

Fig. 3 is a front elevational view of the adjustable mounting base;

Fig. 4 is a fragmentary horizontal view taken on the line 4—4 of Fig. 1;

Fig. 5 is a vertical section taken on the line 5—5 of Fig. 3; and

Fig. 6 is a horizontal section taken on the line 6—6 of Fig. 4.

Figure 1:
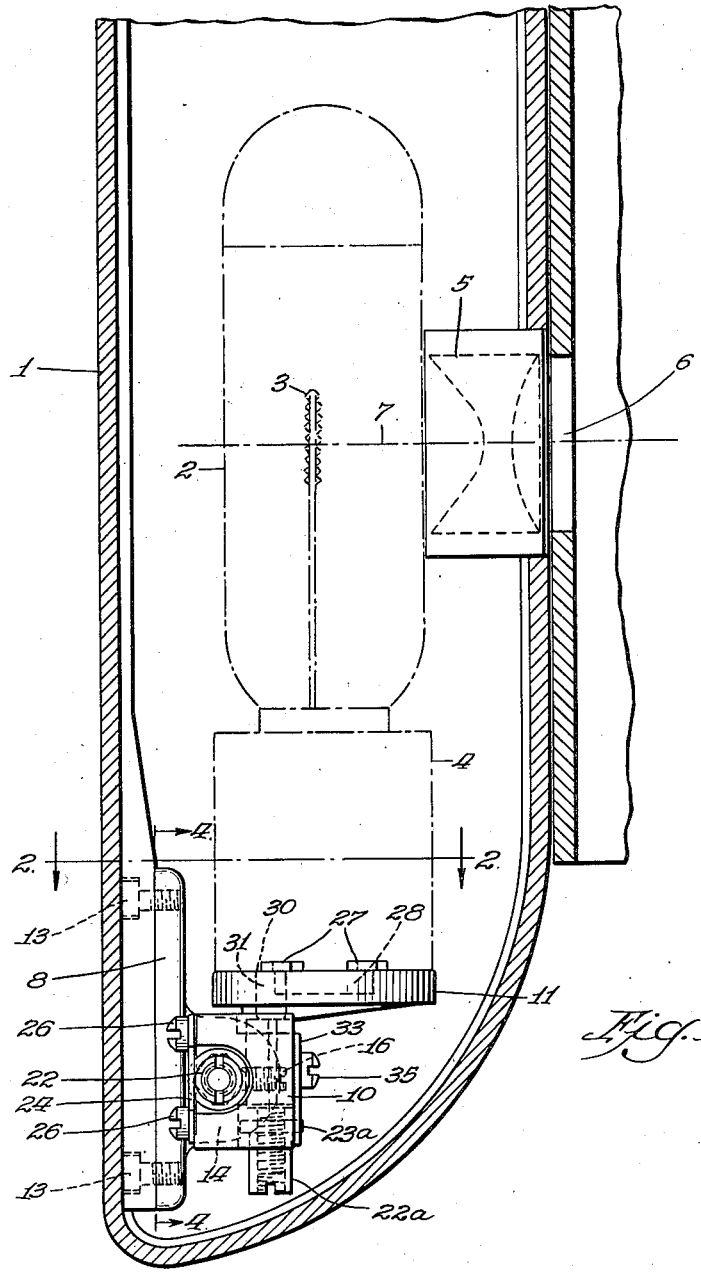
Fig. 1 is a vertical sectional view of the projector lamp housing in a typical motion picture projector, and shows an adjustable lamp mounting embodying the features of the present invention.

The light source in the illustrated projector is of conventional type and includes a lamp housing 1 which is adapted to be mounted on a suitable support (not shown), a projector lamp 2 having the usual multiple coil filament 3 and an associated socket 4, a condenser lens 5 for collecting the light from the filament, and projecting it upon an aperture 6 in the housing 1, and through which the light is directed onto the film being projected. The lamp support means is adjustable so that the plane of the filament 3 may be adjusted to centrally aline with the optical axis of the condensing lens 5, indicated by line 7, and thus improve the uniformity of light distribution in the projected image. To this end, the support of the present invention provides for adjustment in both vertical and lateral directions.

Structurally the support includes a stationary mounting bracket 8 adapted to be attached to the housing 1, an elongated, horizontally disposed guide 9 extending from said bracket, an intermediate bracket 10 slidably mounted on said guide, a lamp socket mounting pedestal 11, an elongated, vertically disposed pedestal guide 12, adapted to be slidably mounted in the intermediate bracket 10, and screw means whereby the intermediate bracket 10 and the mounting pedestal 11 may be moved relative to the stationary mounting bracket 8 and the housing 1, along the guides 9 and 12.

The mounting bracket 8 may be attached to the housing 1, in any suitable manner, such as by machine screws 13. An outwardly extending portion 14 of the bracket 8 is provided with a square sided passageway 15 adapted to receive the quadrangular shaped prism portion of the horizontal guide 9. A tapped hole and set screw 16 are provided to lock the guide member 9 in the supporting bracket 8.

The outer end of the horizontal guide 9 is provided with a cylindrically shaped threaded portion 17 for cooperating with the lateral adjusting means. The intermediate bracket 10 is provided with a lateral guideway 18, which engages the prism-shaped portion of the horizontal guide 9, and an enlarged portion at one end for receiving the lateral adjusting means as shown in the drawings at 20.

The lateral adjusting means, illustrated particularly in Figs. 4 and 6, include an adjusting nut 22 which is screwed onto the threaded portion 17 of the horizontal guide prism 9. The adjusting nut 22 has an enlarged circular portion 23, which is adapted to fit within the enlarged portion 20 of the guideway 18. During assembly a cover 24 having a cut-out portion 25 for engaging the enlarged portion 23 of nut 22 is placed over the guide 9 and securely fastened by suitable means such as cap screws 26. Thus the intermediate bracket 10 may be moved in a transverse or lateral direction by rotating adjusting nut 22, whose enlarged portion 23 bears in cut-out portion 25 of the cover plate 24, and draws the intermediate bracket 10 along the guide member 9.

The projector lamp 2, with its associated socket 4 is attached to the mounting pedestal 11 by suitable means such as screws, and is rigidly positioned by the lugs 27 provided on the pedestal 11. The pedestal 11 may be of any convenient shape, but is preferably proportioned as shown in the drawings. The upper face of the pedestal 11, is provided with a recessed portion 28 and an associated hole 29, which are adapted to contain the electrical wires (not shown) used to provide power for the lamp 2. A vertical hole 30 is provided in the pedestal 11 for attaching the vertical guide 12.

The vertical guide 12 has a quadrangular shaped portion similar to horizontal guide 9, and a cylindrical portion on each end. One of the cylindrical portions 31 is knurled, and is press fitted into hole 30 in the pedestal. The other cylindrical end portion 32, is threaded so as to provide vertical adjustment. The intermediate bracket 10 is provided with a vertical guideway 19 which is adapted to engage the prism shaped portion of the vertical guide 12, and this guideway terminates in an enlarged portion 21 for receiving the vertical adjusting nut 22a, which is similar in construction to the horizontal adjusting nut 22.

The guide column 12 is secured in position by means of a cover plate 33 having a cut-out portion 34 for engaging the enlarged circular portion 23a of the adjusting nut 22a. The cover plate 33 may be secured in place by means of cap screws 35 and is similar to cover plate 24. Thus, the pedestal 11 may be raised or lowered in relation to the intermediate bracket 10 by the cooperating action of the threaded portion of the guide 12 and the enlarged portion 23a of the adjusting nut 22a bearing on the cut-out portion 34 of the cover plate 33.

In operation the nuts 22 and 22a are adjusted with a screw driver which is admitted to the housing through suitable access holes. The lamp 2 may be adjusted in the transverse direction by adjusting nut 22, which draws the intermediate bracket 10 and the associated pedestal and lamp along a path defined by the horizontal guide 9. Vertical adjustment is effected by turning adjusting nut 22a, whereby the guide member 12 is vertically extended from or retracted into guideway 19 provided in the intermediate bracket 10.

The invention provides a simple, compact, adjustable support or mounting, which allows adjustment in either a vertical or a lateral direction without changing the adjustment in the other direction. One of the important features of the invention is the provision for prism-shaped guide members which assures an accurate sliding fit between the guides and the intermediate bracket at all times, thereby preventing expansion or expansion of the parts from unduly tightening the adjustment means or from allowing undue slack movement in the over-all adjustment. The parts may be fabricated in any convenient manner known to the art, but are of such shape that they may be economically stamped or die cast with a minimum of finish machining.

Changes in the described construction may be made without departing from the spirit of the invention, the scope of which should be determined by reference to the following claims.

I claim:

1. An adjustable lamp support comprising a stationary support bracket, a first guide supported by said bracket and secured against rotation and axial movement relative to it, said guide having a threaded end portion extending from said support bracket, an intermediate bracket slidably mounted on said first guide, a socket mounting pedestal having a second guide extending therefrom and having a threaded portion on its end, said second guide being slidably mounted in the intermediate bracket, and screw means cooperating with said threaded portions and said intermediate bracket for effecting relative adjustment of said pedestal incident to rotation of said screw means.

2. An adjustable lamp support comprising a stationary support bracket, a single horizontal prism-shaped guide mounted on said bracket and secured against rotation and axial movement relative to it, said guide extending outwardly from said support bracket and having a threaded end portion, an intermediate bracket slidable on said guide and having a horizontal guideway engaging said guide and defined by surfaces that prevent relative rotation of said guide and intermediate bracket, a socket supporting pedestal having a single downwardly extending prism-shaped vertical guide having a threaded portion at its lower end, said intermediate bracket having a vertical guideway slidably receiving said guide and defined by surfaces that prevent rotation of the guide in the guideway, and screw means cooperating with said threaded portions and said intermediate bracket whereby said intermediate bracket and pedestal may be projected horizontally, and said pedestal may be vertically extended and retracted in relation to said intermediate bracket.

3. In a lamp assembly comprising a support bracket, two angularly related elongate guide members, one of which is supported by said support bracket and the other of which supports a lamp mount, and an intermediate bracket mounted on the bracket-supported guide and supporting the other guide for axial movement; the improvement comprising means securing each of said guides against rotation in the bracket supporting it, cylindrical threaded portions in the respective guide members, and a nut threaded on each said threaded portion, each nut being rotatable relative to the intermediate bracket and secured against axial movement relative to it.

4. In a lamp assembly comprising a support bracket, an elongate guide member extended from and supported fixedly by said bracket and having a cylindrical threaded end portion, and a second elongate guide member angularly related to the first said elongate guide member, said second guide member carrying a lamp mount and having a cylindrical threaded portion; an intermediate bracket slidably supported on the first guide mmeber and slidably supporting the second guide member, said bracket comprising a body having in each of two sides a channel, said channels being in axial angular relation corresponding to that of the guide members and slidably receiving said guide members, cover plates secured to said sides of the body overlying said channels and slidably contacting the respective guide members, and screw means threaded on said cylindrical portions of the guide members, said screw means being rotatable but fixed against axial movement relative to said body.

5. In a lamp assembly comprising a support bracket, an elongate prism-shaped guide member extended from and supported fixedly by said bracket and having a cylindrical threaded end portion, and a second elongate prism-shaped guide member angularly related to the first said guide member, said second guide member carrying a lamp mount and having a cylindrical threaded portion; an intermediate bracket slidably supported in the first guide member and slidably supporting the second guide member, said bracket comprising a body having in each of two sides a channel, said channels being in axial angular relation corresponding to that of the guide members, slidably receiving said guide members and having angularly related adjacent surfaces contacting corresponding surfaces of said guide members, cover plates secured to said sides of the body overlying said channels and slidably contacting the respective guide members, and screw means threaded on said cylindrical portions of the guide members, said screw means being rotatable but fixed against axial movement relative to said body.

6. In a lamp assembly comprising a support bracket, an elongate guide member extended from and supported fixedly by said bracket and having a cylindrical threaded end portion, and a second elongate guide member angularly related to the first guide member carrying a lamp mount and having a cylindrical threaded portion, an intermediate bracket slidably supported on the first guide member and slidably supporting the second guide member, said bracket comprising a body having in each of two sides a channel, said channel being in axial angular relation corresponding to that of the guide members and slidably receiving said guide members, cover plates secured to said sides of the body overlying said channels and slidably contacting the respective guide members, each of said channels having an enlarged portion and each of said cover plates having a slot in the region of such portion and extending transverse to said channel, and a nut in the enlarged portion of each channel threaded on the cylindrical portion of the guide member in said channel, each said nut having a flange extending into the slot of the associated cover plate.

THOMAS J. MORGAN.

REFERENCES CITED

The following references are of record in the file of this patent:

UNITED STATES PATENTS

| Number | Name | Date |
|---|---|---|
| 1,138,848 | Dake | May 11, 1915 |
| 1,282,224 | Hardyman | Oct. 22, 1918 |
| 1,305,406 | Peterson | June 3, 1919 |
| 1,526,696 | Davis | Feb. 17, 1925 |
| 1,863,300 | Dina | June 14, 1932 |
| 1,884,603 | Dina | Oct. 25, 1932 |